United States Patent [19]
Kronberg

[11] Patent Number: 5,431,148
[45] Date of Patent: Jul. 11, 1995

[54] IMMERSIBLE SOLAR HEATER FOR FLUIDS

[75] Inventor: James W. Kronberg, Aiken, S.C.

[73] Assignee: The United States of America as represented by the United States Department of Energy, Washington, D.C.

[21] Appl. No.: 240,474

[22] Filed: May 10, 1994

[51] Int. Cl.⁶ ............................................. F24J 3/02
[52] U.S. Cl. .................... 126/564; 126/561; 126/565; 4/493
[58] Field of Search ............... 126/564, 561, 562, 565, 126/566; 4/493, 495, 496, 498

[56] References Cited

U.S. PATENT DOCUMENTS

| | | |
|---|---|---|
| 2,580,555 | 1/1952 | Kroeger. |
| 4,148,301 | 4/1979 | Cluff ............................. 126/271 |
| 4,214,572 | 7/1980 | Gonder ........................... 126/425 |
| 4,222,366 | 9/1980 | Acker ............................. 126/565 |
| 4,284,059 | 8/1981 | Thomason ....................... 126/564 |
| 4,300,530 | 11/1981 | Tetirick .......................... 126/415 |
| 4,458,668 | 7/1984 | Sheldon .......................... 126/565 |
| 4,470,404 | 9/1984 | Kremen .......................... 126/564 |
| 4,510,920 | 4/1985 | Walmet ........................... 126/561 |
| 5,143,051 | 9/1992 | Bennett .......................... 126/561 |
| 5,143,052 | 9/1992 | Case .............................. 126/565 |

FOREIGN PATENT DOCUMENTS 2820772  11/1979  Germany .......................... 126/564

Primary Examiner—Larry Jones
Attorney, Agent, or Firm—Brian R. Tumm; Harold M. Dixon; William R. Moser

[57] ABSTRACT

An immersible solar heater comprising a light-absorbing panel attached to a frame for absorbing heat energy from the light and transferring the absorbed heat energy directly to the fluid in which the heater is immersed. The heater can be used to heat a swimming pool, for example, and is held in position and at a preselected angle by a system of floats, weights and tethers so that the panel can operate efficiently. A skid can be used in one embodiment to prevent lateral movement of the heater along the bottom of the pool. Alternative embodiments include different arrangements of the weights, floats and tethers and methods for making the heater.

20 Claims, 3 Drawing Sheets

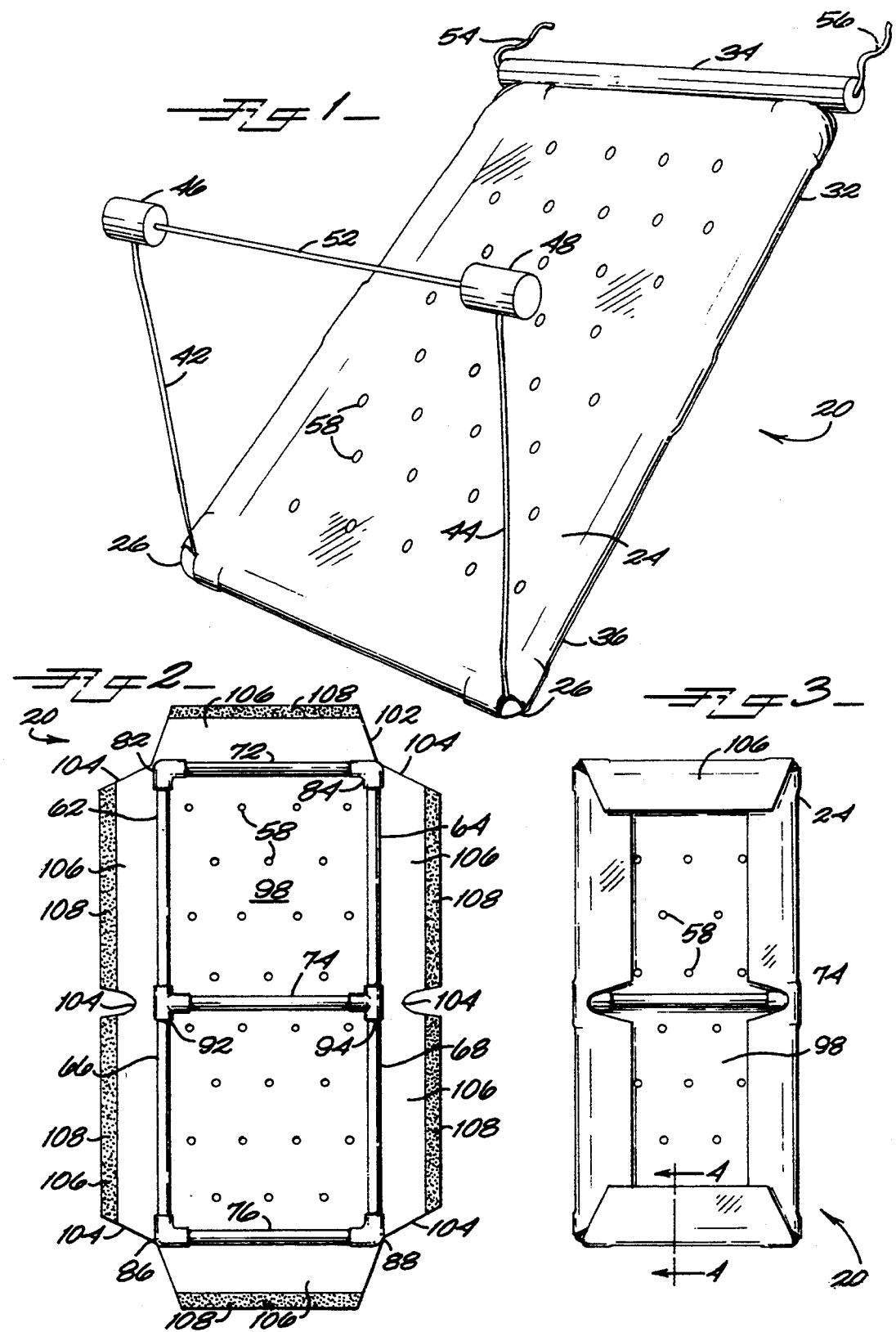

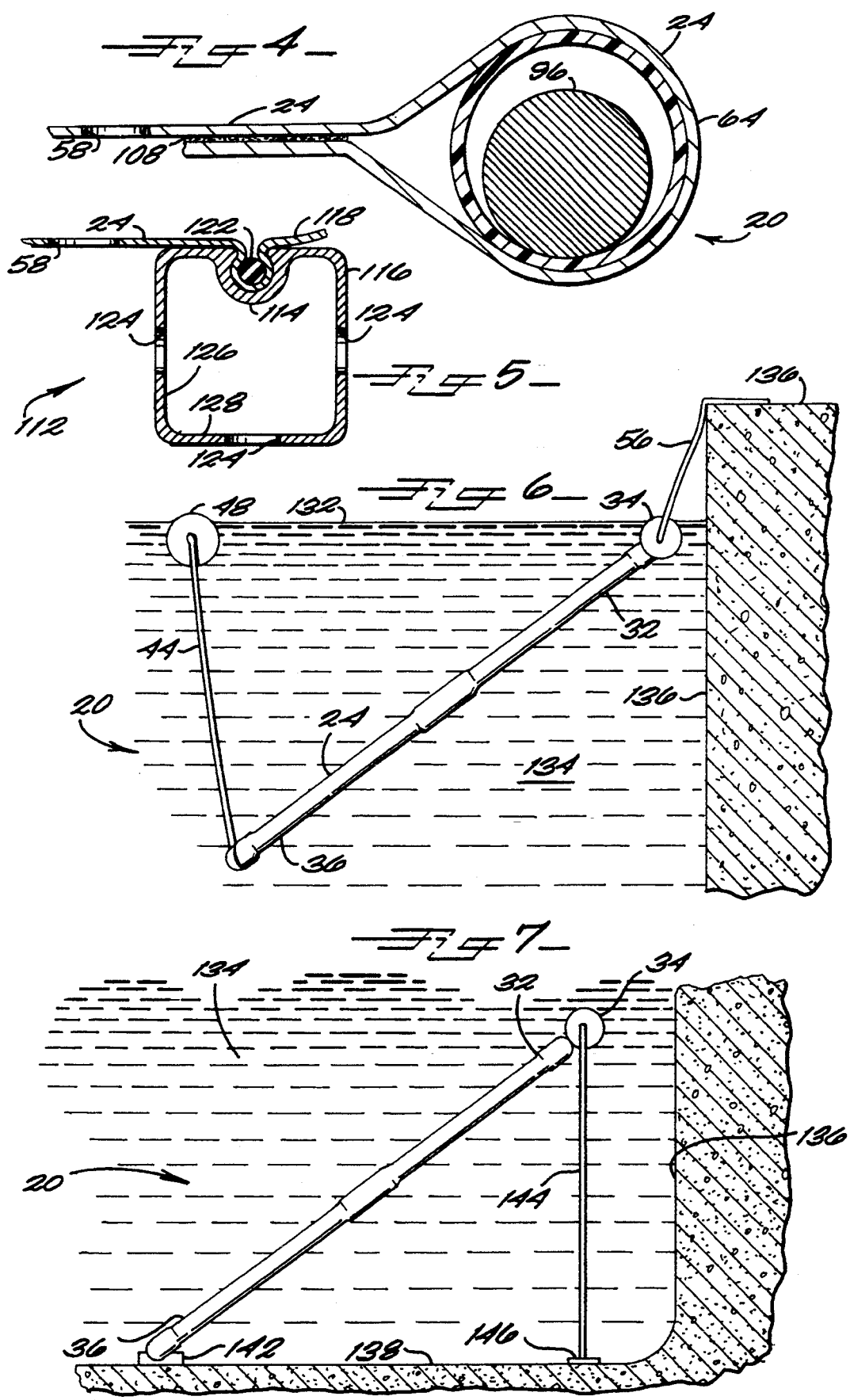

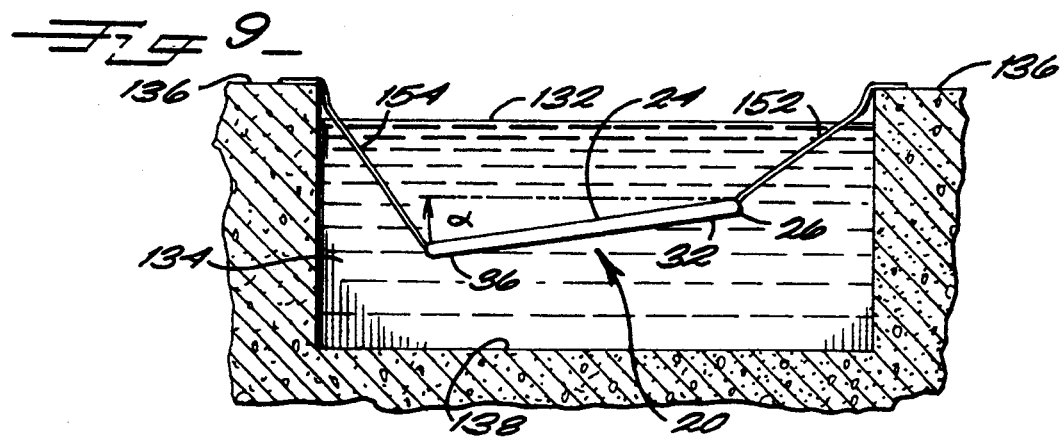
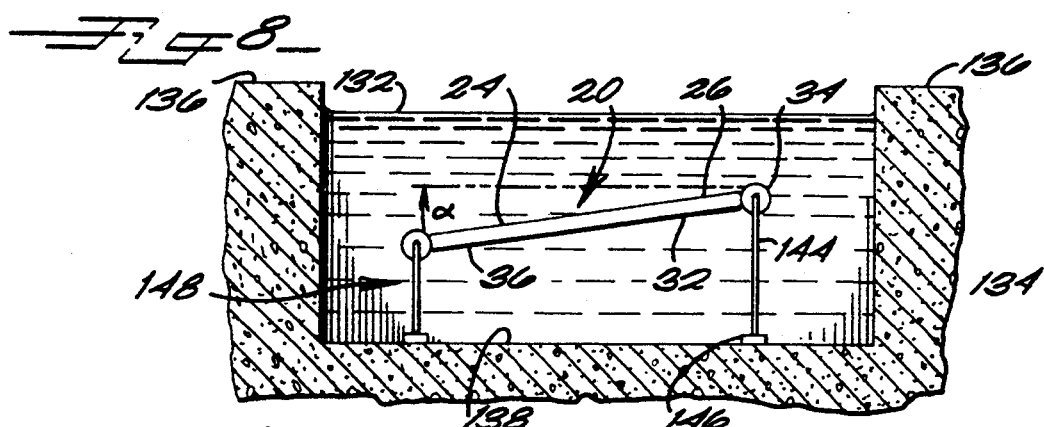
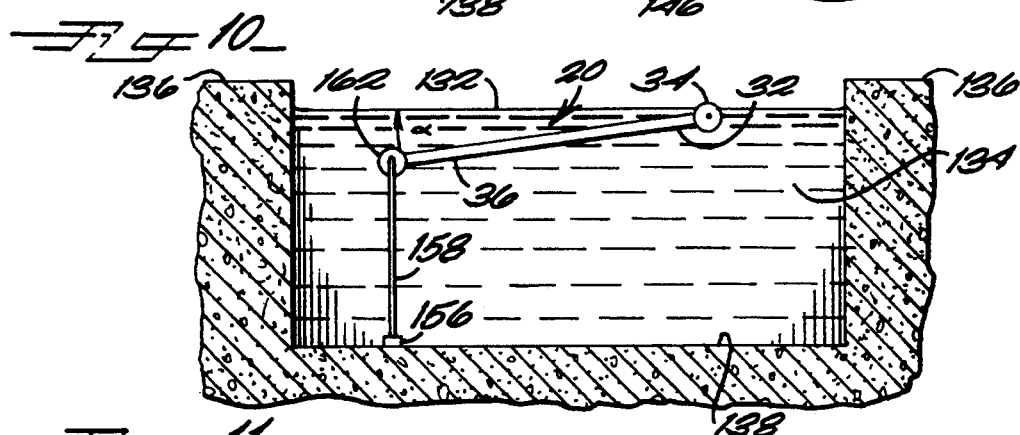
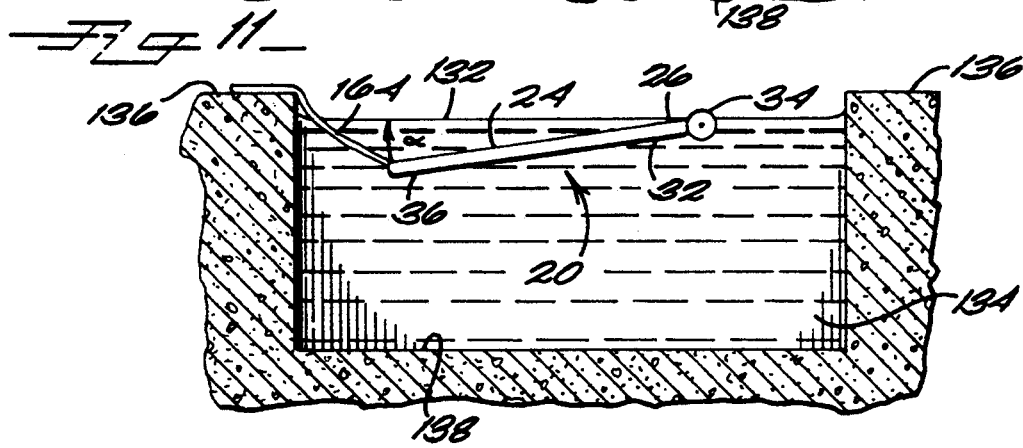

IMMERSIBLE SOLAR HEATER FOR FLUIDS

The United States Government has rights in this invention pursuant to Contract No. DE-AC09-89SR18035 between the U.S. Department of Energy and Westinghouse Savannah River Company.

BACKGROUND OF THE INVENTION

1. Field of the Invention

The present invention relates to solar heating of fluids. More particularly, the present invention relates to an immersible solar heater for use in heating a body of a fluid, such as a swimming pool.

2. Discussion of Background

Solar energy can be collected and converted to electricity by solar cells or stored as heat by solar collectors that simply absorb the sun's heat energy and, for example, transfer it to a working fluid through a heat exchanger. Devices of the latter type have been used in our society for some time, and have been used for a number of different applications, including the heating of water and other fluids. Solar energy collectors may be in the form of one or more solar panels interconnected to each other and to a heat sink.

The use of solar heating devices in conjunction with bodies of water such as water storage tanks and swimming pools is also known. For example, in U.S. Pat. No. 4,300,530, Tetirick discloses a solar heat control apparatus having a floating, covered frame, and a plurality of metal plates carried by the frame at any one of a number of desired angles. The plates have a heat absorbent coating on one side and a radiation reflective coating on the other. In operation, the lower portions of the plates are positioned into the water so that the heat collected by the plates is transferred to the water.

Gonder, in U.S. Pat. No. 4,214,572, discloses a device for collecting solar energy whereby a plurality of solar energy collectors are attached to a frame that floats on a pool of water. The collector can be oriented relative to the direction of the sun and has an absorption device through which water passes to absorb heat.

A similar reference, U.S. Pat. No. 4,148,301, discloses a solar energy collector and storage system equipped with a sun-tracking mechanism. The system comprises a floating platform having an array of reflectors and associated thermal collector tubes mounted thereon. The suntracking mechanism periodically repositions the energy collectors with respect to the sun to provide better collection efficiency. Liquid is heated by passing it through piping upon which the array of collectors focuses the collected light.

Although solar heating devices specifically configured for heating water are known to exist, there is still a need for a simple, rugged and effective yet inexpensive means for heating a body of water such as in a swimming pool without using pumps, motors or external power sources, as are needed in one or more of the solar heating devices discussed previously.

SUMMARY OF THE INVENTION

According to its major aspects and broadly stated, the present invention is an immersible solar heater for passively heating a body of water. In particular, the solar heater comprises a rigid frame having a solar panel attached thereto for collecting solar energy and directly transferring that energy to the water to heat the water. Preferably, the solar panel is a thin, flexible and dark-colored material adapted to operate while being submerged. The frame, which can be configured to sink below or float near the surface of the water, has means for positioning the frame within the body of water at a preselected angle with respect to the surface of the water. The positioning means preferably comprises the combination of a plurality of floats, weights and tethers connected to the frame that enables the frame to be oriented at an operating angle suitable for maximizing the amount of incident light. The immersion heater is made by forming a plurality of holes in the solar panel to facilitate its immersion and then attaching it to the frame so that it is held under tension.

A major feature of the present invention is the combination of floats, tethers and weights. This feature enables the position of the solar panel to be maintained below the surface of the water and at a preselected angle with respect to the surface of the water being heated. Sufficient weight is needed to immerse the panel but floats are needed to raise one end with respect to the other. Tethers help to maintain the angle of the panel and to adjust the angle. The operating angle of the solar panel determines the heater's collection efficiency and thus the overall amount of heat produced. Also, because the solar panel operates below the surface of the water, it can transfer all of its absorbed heat to the water and is not affected by harmful ultraviolet rays that are strongly filtered by the water.

The choice of material used for the frame and for the solar panel is an important feature of the invention. The materials are simple and readily available. For example, the solar panel is preferably made from sheets of a dark-colored plastic. Also, the frame can be formed from polyvinyl chloride (PVC) pipe segments and joints, and internally weighted with common steel bars such as concrete reinforcing bars.

The simplicity of the device is an important advantage of it compared to more complicated solar heating devices that rely on motors, pumps or an external power source. The positioning means and materials contribute to this simplicity and enable the passive transfer of collected heat energy to the body of water with minimum effort.

Another feature of the present invention is the skid pad, used in one of the preferred embodiments. The skid pad keeps one end of the solar heater in contact with the bottom of the swimming pool or other water container to minimize lateral movement of the solar heater, thus helping to maintain the solar panel at a preselected angle.

Other features and advantages of the present invention will be apparent to those skilled in the art from a careful reading of the Detailed Description of a Preferred Embodiment presented below and accompanied by the drawings.

BRIEF DESCRIPTION OF THE DRAWINGS

In the drawings,

FIG. 1 is a perspective view of a solar heating device for heating a body of fluid according to a preferred embodiment of the present invention;

FIG. 2 is a bottom view of the solar heating device according to a preferred embodiment of the present invention during assembly;

FIG. 3 is a bottom view of the solar heating device of FIG. 2 upon completion of assembly;

FIG. 4 is a partial cross-sectional view of the frame of the solar heating device taken along lines 4—4 of FIG. 3;

FIG. 5 is a partial cross-sectional view of the frame of the solar heating device according to an alternative embodiment;

FIG. 6 is a side view of the solar heating device according to the preferred embodiment of the present invention during a preferred method of use;

FIG. 7 is a side view of the solar heating device according to an alternative embodiment of the present invention during an alternative method of use;

FIG. 8 is a side view of the solar heating device according to an alternative embodiment of the present invention during an alternative method of use;

FIG. 9 is a side view of the solar heating device according to an alternative embodiment of the present invention during an alternative method of use;

FIG. 10 is a side view of the solar heating device according to an alternative embodiment of the present invention during an alternative method of use: and FIG. 11 is a side view of the solar heating device according to an alternative embodiment of the present invention during an alternative method of use.

DETAILED DESCRIPTION OF A PREFERRED EMBODIMENT

In the following description similar components are referred to by the same reference numeral in order to simplify the understanding of the sequential aspect of the drawings.

Sunlight, including visible light and other electromagnetic radiation such as infrared light, striking the surface of a body of water (or any other transparent substance) is divided into reflected rays and transmitted rays. Ray reflection is greatest at shallow, skimming angles with respect to the surface of the body of water and least when the incidence is nearly perpendicular to the surface of the water. Although the proportion of the incoming light that is reflected depends on a number of factors, it is roughly equivalent to the sine of the angle of incidence, with the remaining light being transmitted through the water.

While the angle of reflection is equal to the angle of incidence, transmitted light is refracted downward according to Snell's law, which states that the sine of the angle of incidence with respect to vertical is equal to the sine of the angle of refraction with respect to vertical multiplied by the refractive index of the body of water (which is approximately 1.33). Based on this relationship, for an energy absorbing panel to absorb the greatest amount of energy possible (which occurs when the panel is perpendicular to the rays being absorbed), a solar panel immersed in a body of water will have to be positioned slightly closer to the horizontal than would a corresponding solar panel in air.

Referring now to FIG. 1, the solar heating device 20 in its preferred embodiment is a solar panel 24 attached to a frame 26 so that solar panel 24 is held under tension. Solar heating device 20 is ideal for use in heating swimming pools, but it will become readily apparent that solar heating device 20 can also be used in other fluid bodies that benefit from being heated, such as aquaculture ponds, evaporation ponds and similar fluid bodies, as long as the materials used in the solar heating device 20 are not adversely affected by the environment of the fluid being heated, and the fluid transmits either infrared or visible light, or both.

Device 20 has a first end 32 to which a cylindrical float 34 is attached and a second end 36 to which a pair of tethers 42, 44 is attached. Corresponding floats 46, 48 are attached to tethers 42, 44 and a bar 52, which is both rigid and buoyant, connects floats 46, 48. Also, an additional pair of tethers 54, 56 may be attached to cylindrical float 34 for use as described later.

Solar panel 24 can be virtually any shape and size, but is preferably and most conveniently rectangular, and consists of a sheet of thin, dark-colored, relatively flexible material. For example, a very inexpensive solar panel 24 can be made from agricultural plastic "mulch" which is 4-mil black polyethylene sheeting. Carbon black is a preferred coloring agent since it strongly absorbs infrared as well as visible light, is inexpensive, and will not fade over time.

Solar panel 24 can be made of higher-quality and more durable materials such as polyethylene terephthalate, sold under the brand name MYLAR ®, polyvinyl chloride or any polyolefin. Polyolefins include polyethylene, polypropylene, polybutadiene and other polymers including mixed polymers like EPDM rubber.

The material for solar panel 24 should be sufficiently strong to hold frame 26 in shape without requiting additional bracing such as cross-wires and the like on frame 26. The material for solar panel 24 can be two polyethylene sheets, say one blue and the other black, laminated to a woven mesh presumably of NYLON ® or polyester. Preferably, solar panel 24 is made from fiber-mesh-reinforced, black polyethylene. However, solar panel 24 can be any suitable panel that collects solar rays efficiently.

Also, solar panel 24 should have a plurality of drainage slots or holes 58 formed therein so that water can pass from one side of solar panel 24 to the other. Preferably, holes 58 are one-half-inch in diameter and are approximately three to four inches apart. Holes 58 permit water to pass more easily from one side of solar panel 24 to the other. Without holes 58, solar panel 24 can be damaged by the opposed forces of water resistance and of a user moving solar panel 24 against such resistance.

Referring now to FIGS. 2-3, frame 26 is preferably made of three-quarter-inch, Schedule 20 polyvinyl chloride (PVC) pipe and fittings. In this preferred embodiment, frame 26 comprises four longitudinal members 62, 64, 66, 68, three cross-members 72, 74, 76, four elbow fittings 82, 84, 86, 88, and two "T" fittings 92, 94 formed as shown in FIG. 2. Preferably, all of the fittings are selected or trimmed so that they have no sharp edges.

Preferably inserted into the interior of cross-members 74 and 76 are lengths of approximately ⅜" O.D. steel bar 96 (see FIG. 4, where only one bar is shown). For example, bar 96 can be #5 concrete reinforcing rod. Steel bars 96 are preferably inserted into the interior of cross-members 74 and 76, but not in 72, which is located at first end 32 of frame 26. Steel bars 96 may be of sufficient length so that they extend partially into "T" fittings 92, 94 and elbow fittings 86, 88, respectively. Alternatively, steel bars 96 can be embedded within cross-members 74 and 76 using an epoxy or otherwise anchored within cross-members 74, 76.

The fittings and PVC pipe members may be joined by solvent welding or other suitable methods, so long as frame 26 forms a watertight enclosure filled with air. It is important that frame 26 remain watertight to provide inherent flotation for solar panel 24 except where weighted by steel bars 96. Also, watertightness is desired to prevent rusting of the rods and to minimize dripping of the water from solar panel 24 when device 20 is removed from the water. Alternatively, longitudinal members 62, 64, 66, 68 and cross-members 72, 74, 76 can be filled with urethane foam or another suitable water-resistant, closed-cell foam that will provide buoyancy and prevent water from entering.

It is well within the scope of the invention to use other types of piping segments and corresponding fittings, which may or may not necessitate the need for steel bars 96 in cross-members 74, 76. Any plastic of sufficient strength and impact resistance could be used to make one or more of the various pans of frame 26. For example, the piping segments that form frame 26 could be molded from recycled high-density polyethylene with pigments or other substances added to make it resistant to degradation by sunlight. Although not necessary, it is preferred that alternate piping segments and fittings or appropriate connectors be formed into the same shape as shown by the PVC piping segments and fittings as shown in FIG. 2.

Preferably, frame 26 has rounded corners and smooth edges. This is especially well suited for use of device 20 in swimming pools having vinyl linings and on occasions when children may come into contact with device 20. Frame 26 of this kind is also well-adapted to being sold in kit form for assembly on-site by the user. In the form of a kit, factory foam-filling within the piping segments, as discussed above, would be preferable because simple mechanical connectors such as snap-in plastic pins could be included in the kit and the user would not have to work with PVC solvent cement, which is messy, highly flammable and potentially toxic. Also, cross-members 74, 76 could most easily be supplied with steel bars 96 already foamed therein.

Frame 26 preferably measures four feet by eight feet, but obviously can be made into any reasonable size, depending on the heating application. Factors affecting the size of solar panel 24 and frame 26, and consequently device 20, include the size of the fluid body to be heated, the latitude, and the season of the year.

Once frame 26 has been formed, preferably as shown in FIG. 2, solar panel 24 can be attached to frame 26. First, frame 26 is laid on the underside 98 of a sheet 102 that is to be used as solar panel 24. Preferably, sheet 102 is a fiber-reinforced, sunlight resistant plastic that is black on at least one of its two sides (if only one side is black, that side should face away from frame 26). Plastic sheet 102 is cut slightly larger than the dimensions of frame 26. For example, if frame 26 is approximately four feet by eight feet and formed from ¾" nominal diameter PVC pipe, plastic sheet 102 is cut approximately eight inches larger in each dimension.

Also, a plurality of notches 104 (as shown in FIG. 2) are cut in plastic sheet 102 at each corner and one along each side to form tabs 106. Tabs 106 may be formed, for example, by die-cutting using a hot die to melt and seal the cut edges. Holes 58 (discussed above) could also be formed in plastic sheet 102 at this time, preferably in the central area of plastic sheet 102 so that holes 58 are not on or near tabs 106.

Tabs 106 are preferably coated with pressure-sensitive adhesive 108, as by spraying with an adhesive, preferably an aerosol adhesive. Alternatively, tabs 106 could be coated with adhesive 108 by applying suitable-sized pieces of transfer film or double-sided tape. Preferably, a film or tape with peel-off backing left in place would be preferable for use if device 20 exists originally in kit form.

In assembling device 20, plastic sheet 102 is pulled tight on frame 26 and tabs 106 are folded over the outermost dimensions of frame 26 and stuck down onto underside 98 of plastic sheet 102 within the boundary of frame 26, as shown in FIG. 3. Thus, adhesive 108 forms a bond between tabs 106 and underside 98 of plastic sheet 102 (as shown best in FIG. 4).

In an alternative embodiment, as shown partially in FIG. 5, frame 26 is a four-sided frame with each side being made from a single piece of a channel 112, which is preferably made from an extruded aluminum or like material. Each aluminum channel 112 can be a rounded, approximately one-inch-square channel, as shown in FIG. 5, modified by having a groove 114 formed in one side of its outer surface 116.

To attach solar panel 24 to aluminum channel 112, an edge 118 of solar panel 24 is inserted into groove 114. Edge 118 of solar panel 24 is held in groove 114 by the subsequent insertion of a strip of material such as a plastic cord or a plurality of beads 122. The strip or beads 122 can be made of rubber or plastic, but must be deformable to fit in the small opening of groove 114 and then enlarge slightly once positioned within groove 114 to hold edge 116 of solar panel 24 within groove 114.

A plurality of holes 124 are drilled or otherwise formed in the sides 126 and bottom 128 of channel 112 to allow water to enter and exit so that a frame 26 formed by a plurality of channels 112 will not float without external support. All parts of channel 112 are preferably painted or, more preferably, anodized, flat black for maximum light absorption and corrosion resistance.

Instead of the design just described, channel 112 may have an open "U"-shaped cross-section (not shown). In this configuration, the ends of each piece are modified to permit connection with the other pieces, for example, by bolting or riveting. Alternatively, the ends of each piece may be left open and adjacent pieces may be joined by inserting angled adapters.

Referring again to the preferred embodiment, as shown in FIGS. 1-4, once solar panel 24 has been attached to frame 26 as shown in FIG. 3, cylindrical float 34 is attached to first end 32 (see FIG. 1). Cylindrical float 34 is preferably a volume of plastic foam or other lightweight, buoyant material. Preferably, cylindrical float 34 is encased in fiberglass or other material resistant to wear and degradation by sunlight. Also, if frame 26 is a channel, as shown in FIG. 5, cylindrical float 34 needs to be of sufficient diameter and overall buoyancy to support at least half of the underwater weight of frame 26.

Floats 46, 48 are made similar to cylindrical float 34 but each have a rounded, compact form and are joined by bar 52. Floats 46, 48 can be the kind of float that is commonly strung like beads on ropes meant to float in water. Preferably, floats 46, 48 are short and thick in order to maximize flotation capacity in relation to the amount of sunlight intercepted.

Floats 46, 48 are attached parallel to second end 36 of device 20 using tethers 42, 44, as shown in FIG. 1. The lengths of tethers 42, 44 are identical and preferably chosen so that, when in use (as shown in FIG. 6), floats 46, 48 and bar 52 float at the surface 132 of water 134 and second end 36 of device 20 is held at a depth below surface 132 that corresponds to the desired angle of tilt for solar panel 24.

Tethers 42, 44 are preferably strong yet flexible straps, made from polyethylene or other suitable materials, that are permanently fastened to floats 46, 48 and temporarily fastenable to second end 36 of frame 26. Also, tethers 42, 44 may have markings or additional fasteners (neither of which are shown) thereon that are periodically spaced apart to represent various desirable tilting angles. In this manner, the length of tethers 42, 44 between floats 46, 48 and second end 36 of frame 26 can be adjusted by fastening frame 26 to corresponding fasteners along tethers 42, 44.

Alternatively, cylindrical float 34 can be tethered to first end 32 of device 20 similar to the manner in which floats 46, 48 are tethered to second end 36. For such an embodiment to be effective, frame 24 would have to be made of material and/or weighted so that it would sink were it not for the floats and tethers. Also, the length of the tethers connecting cylindrical float 34 to first end 32 of device 20 must differ from the length of tethers 42, 44 so that solar panel 24 tilts at the desired operating angle.

Referring again to FIGS. 1 and 4, additional tethers 54, 56 may be attached to cylindrical float 34 or, alternatively, to first end 32 of frame 26, to prevent drifting. As shown in FIG. 6, tethers 54, 56 are attached to a wall 136 or other stationary objects associated with the water 134 being heated, preferably the side wall of a swimming pool. Tethers 54, 56 may simply be ropes or cords and would be tied to hooks, cleats or other stationary objects spaced along the north edge of the pool to be heated. Preferably, tethers 54, 56 are straps of light-duty NYLON® webbing faced with one component (i.e., the "hook side") of hook and loop fasteners such as VELCRO®. The other component (i.e., the "loop side") of VELCRO® is preferably attached to wall 136 so that tethers 54, 56 can be attached securely yet removed easily. In this manner, device 20 would be held adjacent to the edge of the pool and oriented to face south.

FIG. 7 shows an alternative embodiment of and use for device 20, in which device 20 is configured to rest on the bottom 138 of the swimming pool rather than floating near side wall 136. In this embodiment, tethers 42, 44 and floats 46, 48 at second end 36 of frame 26 are replaced with an anti-skid pad 142, made of rubber or other similar material. Also, tethers 144 (only one shown) connect a weighted bar or pair of weights 146 to either first end 32 of frame 26 or cylindrical float 34. Similar to tethers 42, 44 of device 20 as shown in FIG. 1, tethers 144 are preferably equipped with periodically-spaced fasteners or markings to adjust the angle of device 20 during use.

Anti-skid pad 142 prevents drift due to the friction of pad 142 against bottom 138, thus eliminating the need for tethers 42, 44 (shown in FIGS. 1, 6). In this manner, the action of the weights within second end 36 of frame 26 (as discussed previously) combined with cylindrical float 34 and weighted bar 146, positions frame 26 at an angle with respect to bottom 138. Varying the length of tethers 144 between cylindrical float 34 and weighted bar 146 allows frame 26 to hold solar panel 24 at an angle selected for best operation of device 20.

Alternatively, anti-skid pad 142 could be replaced by a second float, tether and weight combination (shown generally as 148 in FIG. 8) similar to cylindrical float 34, tethers 144 and weights 146. For such an embodiment to be effective, frame 24 would have to be made of material that floats in water 134 (or have floats attached at both ends to cause frame 26 to float) and the length of the additional tethers must be different than the length of tethers 144 so that solar panel 24 remains tilted at the desired operating angle.

Other embodiments are possible using various combinations of weights, floats and tethers, as previously discussed, and are within the scope of the invention. As shown in FIG. 9, frame 26 can have tethers 152, 154 attached to each end and also attached to both sides of wall 136. In this embodiment, frame 26 should be made of a material that sinks in water 134.

Another embodiment is shown in FIG. 10 in which cylindrical float 34 is attached to first end 32 without tethers while second end 36 has a weighted bar 156, a tether (or pair of tethers) 158 and a second cylindrical float (or pair of floats) 162 attached thereto. In this embodiment, it does not matter whether frame 26 is made to float or sink in water 134.

Yet another embodiment is shown in FIG. 11. As shown, cylindrical float 34 is attached to first end 32 without tethers while second end 36 is tethered to wall 136 with tether 164. In this embodiment, frame 26 should be configured so that at least second end 36 sinks in water 134.

Regardless of the position of device 20 during use, it is preferred that solar panel 24 be placed under some minimum thickness of water, thus allowing solar ultraviolet light, which damages solar panels made of polyethylene, to be strongly filtered by the water. When device 20 is not used, for example during normal use of a swimming pool, device 20 may be removed from water 134, stacked vertically against wall 136 beneath surface 132 of water 134, or sent to bottom 138, whichever is most convenient.

In theory, the effectiveness of such a submerged water-heating solar panel can be determined for any angle, any latitude and any season of the year by computing the intensity of the light transmitted through the surface of the water, multiplying by the cosine of the angle at which the transmitted light strikes the solar panel and integrating their product over time throughout the course of a day. The effectiveness is strongly influenced by the angle of sunlight striking the water because such angle governs how much of the light is transmitted through the water surface down to the solar panel and how much is lost through reflection.

Other factors influencing the effectiveness of a submerged, water-heating solar panel include the time of the year and the relative latitude of the solar panel on the earth's surface. The solar panel works better in summer than in winter, and better at low latitudes than high latitudes. However, some degree of control can be managed by changing the angle of the solar panel with respect to the water surface such that an optimum tilt can be achieved, depending on the latitude and season, for maximizing the energy collection efficiency of the solar panel.

For use of the solar panel throughout the year, a workable strategy would be to use the "midwinter" optimum angle, maximizing collection efficiency during cold weather while decreasing the efficiency in warmer weather when less efficiency would likely be needed. Thus, for example, for a latitude of approximately 30 degrees north and a solar panel tilt of approximately 50 degrees from the horizontal, the amount of energy collected by the solar panel per day, theoretically, would be nearly constant from spring through fall (approximately 1300 joules per square centimeter of solar panel per day).

A four-by-eight foot solar panel has an area of approximately 30,000 square centimeters, of which approximately 1-2% is occupied by holes 58. Thus, the energy collected and converted to heat is equivalent roughly to a 400-watt electric heater running continuously day and night from spring through fall. In midwinter, the energy collected is approximately half this amount because much of the incoming solar energy is lost through surface reflection.

In use, solar heating device 20 is positioned within water 134 at the desired angle of operation. Specifically, solar heating device 20 can be positioned just below the surface of water 134 (as shown in FIGS. 1 and 6) by using the combination of tethers 42, 44 and floats 46, 48. Alternatively, solar heating device 20 can be positioned near bottom 138 (as shown in FIG. 7). Positioning solar heating device 20 near the surface of water 134 minimizes shading by pool walls or other objects, thus maximizing efficiency. However, heating tends to be limited (because of conduction) to layers of water higher than the lowest edge of the collector. Positioning solar heating device 20 near the bottom of water 134, though less efficient overall, heats the volume of water 134 more uniformly.

Prior to introducing device 20 to the water, tethers 42, 44 are adjusted so that their lengths correspond to the desired angle of operation for solar panel 24. Similarly, in the alternative embodiment shown in FIG. 7, tethers 144 are adjusted so that solar panel 24 is positioned at the desired angle near bottom 138 of the swimming pool.

Once heating device 20 has been positioned desirably, solar panel 24 begins collecting solar rays transmitted in its direction. Solar panel 24 transfers the heat energy from the collected solar rays directly to water 134. As discussed above, the collection efficiency of solar panel 24, which determines the overall heating efficiency of device 20, varies according to the angle of solar panel 24 with respect to the surface of water 134.

As discussed previously, water 134 is preferably water contained in a swimming pool. However, water 134 can be any body of fluid in any environment as long as neither the fluid nor the environment damages the materials used in making solar heater device 20.

It will be apparent to those skilled in the art that many changes and substitutions can be made to the preferred embodiment herein described without departing from the spirit and scope of the present invention as defined by the appended claims.

What is claimed is:

1. A solar heater for a body of fluid having a surface exposed to light, said body of fluid being in a container having a bottom, said heater comprising:
    a frame having a first end and an opposing second end;
    a panel carried by said frame, said panel adapted for absorbing said light; and
    means carried by said frame for positioning said panel within said body of fluid and below said surface at a preselected angle with respect to said surface, said positioning means including
        first floating means carried by said first end for buoying said first end,
        second floating means carried by said second end for buoying said second end, and
        means for connecting said second end to said bottom so that said second end is lower than said first end and said panel is held at said preselected angle, said panel absorbing said light that enters said body of fluid so that said panel transfers heat from said light to said fluid.

2. The heater as recited in claim 1, wherein said positioning means further comprises:
    means carried by said frame for sinking said frame; and
    means carried by said frame for raising said first end with respect to said second end so that said panel is positioned at said preselected angle.

3. The heater as recited in claim 1, wherein said frame is less dense than said fluid, said positioning means further comprising means for connecting said first end to said bottom so that said first end is higher than said second end.

4. The heater as recited in claim 1, wherein said frame is denser than said fluid, said positioning means further comprising means for raising said first end with respect to said second end, said second end resting on said bottom.

5. The heater as recited in claim 1, wherein said panel has a plurality of holes formed therein to allow said fluid to flow therethrough.

6. The apparatus as recited in claim 1, wherein said positioning means further comprises a skid pad carried by said second end so that, when said second end rests on said bottom, said skid pad limits lateral movement of said second end along said bottom.

7. A solar heater for a body of fluid having a first density and a surface exposed to light, said body of fluid being in a container having a bottom, said heater comprising:
    a frame having a first end, an opposing second end and a second density, said second density being greater than said first density whereby said frame sinks below said surface of said fluid;
    a panel carried by said frame, said panel adapted for absorbing said light;
    means carried by said frame for positioning said frame below said surface at a preselected angle with respect to said surface; and
    means for connecting said first end to said container so that said first end is higher than said second end and said frame is at said preselected angle, said panel absorbing said light that enters said body of fluid so that said panel transfers heat from said light to said fluid.

8. The heater as recited in claim 7, wherein said positioning means further comprises
    a skid pad carried by said second end so that, when said second end rests on said bottom, said skid pad limits lateral movement of said second end along said bottom.

9. The heater as recited in claim 7, wherein said positioning means further comprises:
    first tethering means for tethering said first end a first distance below said surface, said first tethering means having
        a first float dimensioned to raise said first end, and
        a first tether connected between said first end and said first float, said first tether having a first length approximately equal to said first distance; and
    second tethering means for tethering said second end a second distance below said surface, said second tethering means having
        a second float dimensioned to raise said second end, and a second tether connected between said second end and said second float, said second tether having a second length approximately equal to said second distance, said first and second lengths being unequal so that said panel is oriented at said preselected angle when said first and second floats are floating on said surface.

10. The heater as recited in claim 7, wherein said panel has plurality of holes formed therethrough.

11. The heater as recited in claim 7, wherein said frame is made of tubing encasing a rod.

12. The heater as recited in claim 7, wherein said frame is made of polyvinyl chloride tubing encasing a rod, and wherein said positioning means further comprises:

a float carried by said second end for buoying said second end with respect to said first end so that said frame is held at said preselected angle; and means for preventing lateral movement of said first end with respect to said bottom.

13. The heater as recited in claim 7, wherein said solar panel is made of a material having a carbon black coloring agent and selected from the group consisting of polyolefin sheeting, polyethylene terephthalate, polyvinyl chloride and fiber-reinforced polyolefin.

14. The heater as recited in claim 7, wherein said panel has a plurality of holes formed therein to allow said fluid to flow therethrough.

15. A method for making a solar heater for a body of fluid, said method comprising the steps of:

stretching a panel over a frame, said frame having a first end and an opposing second end, said panel adapted to absorb light; and connecting said panel to said frame; and connecting a positioning means to said frame, said positioning means including first floating means carried by said first end for buoying said first end, and second floating means carried by said second end for buoying said second end, said first floating means and said second floating means positioning said frame in said body of fluid at a preselected angle so that said first end is higher than said second end and said panel can absorb light entering said body of fluid.

16. The method as recited in claim 15, wherein said panel is dimensioned to fit around said frame, said solar panel having an edge and an underside, and wherein said stretching step further comprises the steps of:

wrapping said panel around said frame so that said solar panel is under tension across said frame; and adhering said edge to said underside so that said panel remains under tension across said frame.

17. The method as recited in claim 15, wherein said frame has a channel formed therein and a strip of material dimensioned to fit snugly within said channel, wherein said panel has an edge, and wherein said stretching step further comprises the steps of:

positioning said edge in said channel; and then pressing said strip of material into said channel so that said strip of material holds said edge within said channel between said frame and said strip of material.

18. The method as recited in claim 15, further comprising the step of connecting at least one weight and at least one float to said frame.

19. The method as recited in claim 15, wherein said connecting steps further comprises the step of:

connecting a first end of a tether to said frame, said tether having said first end and an opposing second end; and connecting a float to said second end of said tether.

20. The apparatus as recited in claim 15, further comprising the step of connecting a skid pad to said second end so that, when said second end rests on said bottom, said skid pad limits lateral movement of said second end along said bottom.

* * * * *